United States Patent [19]
Breaker

[11] Patent Number: 5,518,257
[45] Date of Patent: May 21, 1996

[54] SEAL DEVICE FOR FLOW LINE APPLICATIONS

[75] Inventor: John V. Breaker, Golden, Colo.

[73] Assignee: Corrosion Control Corp., Lakewood, Colo.

[21] Appl. No.: 110,562

[22] Filed: Aug. 23, 1993

[51] Int. Cl.⁶ ................................................. F16J 15/00
[52] U.S. Cl. ..................... 277/180; 277/198; 277/206 R; 277/207 A
[58] Field of Search ...................... 277/180, 198, 277/199, 205, 206 R, 206 A, 207 A, 227, 235 R

[56] References Cited

U.S. PATENT DOCUMENTS

| | | | |
|---|---|---|---|
| 2,196,953 | 4/1940 | Bohmer, Jr. et al. | 277/180 |
| 2,339,479 | 1/1944 | McCreary | 277/180 |
| 2,827,320 | 3/1958 | Kane | 277/198 |
| 3,302,953 | 2/1967 | Glasgow | 277/206 |
| 3,857,572 | 12/1974 | Taylor | 277/206 R |
| 4,348,032 | 9/1982 | Hansen | 277/206 R |
| 4,585,239 | 4/1986 | Nicholson | 277/205 |

FOREIGN PATENT DOCUMENTS

| | | | |
|---|---|---|---|
| 2048569 | 4/1972 | Germany | 277/180 |

OTHER PUBLICATIONS

Exhibit "A"–Graphite–Filled, Spiral–Wound Seal, Houston, Texas no date of author available.

*Primary Examiner*—Daniel G. DePumpo
*Attorney, Agent, or Firm*—Timothy J. Martin

[57] ABSTRACT

A seal device is adapted to be interposed and compressed between joined pieces in a flow line that is operative to convey a flowing fluid. The seal device comprises an inner seal member and an outer seal retainer member. The inner seal member has a central opening extending therethrough to accommodate the flow of the fluid and has a channel structure that provides a channel opening which faces the central opening and extends therearound. A pair of lips are disposed opposite each other and extend around an inner peripheral portion of the inner seal member. The lips operate to apply a sealing force against the joined pieces when interposed and compressed therebetween. The outer seal retainer member surrounds the inner seal member. The inner seal member and the outer seal retainer member are sized and adapted to seal a space between the joined pieces in the flow line when interposed and compressed between the joined pieces to allow fluid to flow therethrough. The inner seal member is operative to prevent contact of the fluid with the outer seal retainer member when interposed and compressed between the joined pieces. Where the fluid is corrosive, the inner seal member includes a portion formed of anti-corrosive material. Auxiliary resilient spacers and springs may be employed with the inner seal member.

45 Claims, 7 Drawing Sheets

SEAL DEVICE FOR FLOW LINE APPLICATIONS

FIELD OF THE INVENTION

The present invention broadly relates to seals which are adapted to be interposed and compressed between joined pieces in a flow line that is operative to convey a flow of fluid. More particularly, the present invention is directed to a seal device whereby, within certain design limitations, the sealing characteristics of the present invention improve as the hydrodynamic and hydrostatic forces of the fluid contained in the flow line increase. Furthermore, the present invention can be adapted for use in a high corrosion environment.

BACKGROUND OF THE INVENTION

Seal devices have been used in a variety of applications to prevent fluid from leaking between joined pieces. For example, a seal device is interposed and compressed between flanged end-connections of a flow line where in-line process control equipment is installed. In-line process control equipment includes valves, pumps, flow meters, temperature and pressure controllers and the like. This equipment usually cannot be welded into the flow line because time-scheduled maintenance requires temporary removal of this equipment and, occasionally, depleted equipment must be removed for replacement. In-line process control equipment is used in a variety of industries such as the chemical industry for processing, transporting and dispensing a myriad of chemicals and chemical compounds as well as the oil and gas industry for recovering, distributing and processing oil, gas and by-products thereof.

There are several reasons why the efficacy of a seal device is important to the user. First, failure of the seal device could cause significant environmental damage. Second, a high capital investment is typically associated with transporting fluids through a flow line system and leakage of the fluid must be prevented to protect this expensive system from potential damage. Third, a high labor cost is often associated with repair of a damaged flow line system. Numerous problems cause seal devices to leak. Such problems include corrosion, over-torqueing, under-torqueing, temperature, pressure and velocity of the fluid, to name a few.

Most any fluid can be considered corrosive. For example, even water might be considered slightly corrosive if its pH deviates from 7.0; hydrochloric acid having a low pH and hydrogen peroxide having a high pH might be considered highly corrosive. Occasionally, the material used to fabricate the seal device is not compatible with the corrosive nature of the fluid contained in the flow line. Corrosion causes the seal device to deteriorate and, unless it is timely replaced, fluid leakage or subsequent seal blow-out can occur. Also, the temperature and pressure of the corrosive fluid could accelerate the rate by which the seal device deteriorates. Sometimes a single flow line is used to transport two or more types of fluids at different times. The material used to fabricate the seal device might be compatible with one type of fluid but not the other. Thus, one fluid could cause the seal device to corrode and, subsequently, it could fail.

To compress the seal device between the flanged end-connections of the joined pieces in the flow line, fasteners, such as a common nut and bolt combination, are often used. Although installation instructions of a particular seal device might include specific torque requirements for proper sealing, an installer still might apply too much torque or too little torque. It is also possible that even if the correct range of torque is applied to the fasteners, the amount of compression force is distributed unevenly around the seal device. When compressed, the seal device then may not deform in a uniform manner. Thus, improper torqueing of the fasteners to compress the seal device may result in leakage of the fluid from the flow line.

Particularly in industrial applications, a seal device is not recommended for re-use after it has been removed from operations. This is due to the fact that the material used to fabricate the seal device deforms when it is compressed between the joined pieces in a flow line. The material deforms within its modulus of elasticity during operations but does not recover fully thereafter. If this used seal device is placed back into operation, it is possible that further compression of it will extend beyond its modulus of elasticity thus destroying its sealing capabilities.

Furthermore, during operations, the seal device is acted upon by the hydrodynamic and hydrostatic forces exerted by the fluid. Generally, such forces act on commonly known seal devices in a manner that cause the seal device to expand radially outwardly, that is, in the plane of the flanges. Little, if any, of these forces is directed towards improving the sealing characteristics of the seal device.

It is possible in some applications that the temperature and/or the pressure of the fluid might fluctuate throughout a range. Temperature and/or pressure fluctuations can cause thermal and mechanical expansion and contraction of the material comprising the seal device. Unless the material chosen for fabrication of the seal device has been selected with these design considerations in mind, it is possible that the sealing device could lose its sealing capabilities due to material fatigue caused by numerous cycles of thermal and mechanical expansion and contraction.

Given the problems in seal devices as stated above, a need exists to improve seal technology. It would be advantageous if an improved seal device could be designed for improved sealing capability by utilizing the hydrodynamic and hydrostatic forces of the fluid contained in the flow line. It would also be advantageous if the sealing device could be fabricated from corrosion resistant materials which could resist corrosion in a highly corrosive environment. Another need in the current seal technology would be to provide a seal device that is less sensitive to exacting torqueing requirements so that there is no effect upon the performance of the seal device as a result thereof. Another need would be to provide a seal device that can be reused even though it has been used in prior operations.

Another need would be to provide an improved seal device that would be generally insensitive to expansion and contraction cycles due to fluctuations in temperature and/or pressure. Another need would be to produce a seal device which would be compatible with a variety of fluids regardless of their corrosive nature, temperature and/or pressure. The present invention is directed to such an improved seal device.

SUMMARY OF THE INVENTION

It is an object of the present invention to provide a new and useful seal device which utilizes the hydrodynamic and hydrostatic forces of the fluid contained in the flow line to improve its sealing capabilities.

It is a further object of the present invention to provide a seal device which is fabricated from a corrosion resistant material to withstand a highly corrosive environment generated by highly caustic or highly acidic fluids contained in the flow line.

It is another object of the present invention to provide a seal device which is less sensitive to exacting torque requirements for compressing the seal between joined pieces of the flow line.

Yet another object of the present invention is to provide a seal device fabricated from a corrosion resistant material so that a single seal device can be compatible with more than one fluid contained in the flow line.

Still a further object of the present invention is to provide a seal device which can be reused after being used in prior operations.

Yet another object of the present invention is to provide a seal device which is generally insensitive to cycles of expansion and contraction caused by fluctuations in temperature and/or pressure.

According to the present invention, a seal device is described which is adapted to be interposed and compressed between joined pieces in a flow line that is operative to convey a flowing fluid. Broadly, the seal device comprises an inner seal member and an outer seal retainer member. The inner seal member has a central opening extending therethrough to accommodate the flow of the fluid and has a channel structure that provides a channel opening facing the central opening and extending therearound. The inner seal member provide a pair of lip-like structures which are disposed opposite each other and extend around an inner peripheral portion of the inner seal member. The lips operate to apply a sealing force against the joined pieces when interposed and compressed therebetween.

The outer seal retainer member surrounds the inner seal member. The inner seal member and the outer seal retainer member are sized and adapted to seal a space between the joined pieces in the flow line when interposed and compressed between the joined pieces to allow fluid to flow therethrough. The inner seal member is operative to prevent contact of the fluid with the outer seal retainer member when interposed and compressed between the joined pieces.

The outer seal retainer member has a select outer seal retainer member thickness and the inner seal member has a select inner seal member thickness greater than the select outer seal retainer member thickness when the seal device is in a relaxed state. However, the inner seal retainer member thickness is substantially equal to the outer seal retainer member thickness when the seal is interposed and compressed into a compressed state between the joined pieces in the flow line.

The inner seal member includes an outer seal portion and the outer seal retainer member includes an inner seal retainer portion adapted to contact the outer seal portion of the inner seal member. In one embodiment, the inner seal member includes a seal jacket element adapted to grip the inner seal retainer portion of the outer seal retainer member. It is preferable that the inner seal member include a spring element deposed within and around the seal jacket element which spring element operates to bias the seal jacket element coaxially outwardly against the joined pieces. The spring element may be configured in cross-section as a V-shape or a U-shape. The spring element can be either a V-shaped finger spring or a pair of bellvilles which are in contact at respective outer peripheral edges to define a vertex. The spring element can also be an O-ring.

It is also preferable that the inner seal member includes a spacer element which is preferably resilient and is disposed within and around the seal jacket element. The spacer element has a first side adapted to receive a spring vertex portion when the V-shaped spring element is included, and a second side of the spacer element opposite the first side is adapted to abut the inner seal retainer portion of the outer seal retainer member. The spacer element is sized to provide a resilient force coaxially outwardly against the inner seal member.

As one alternative, the inner seal member can be membrane. Preferably, the inner seal member would include a spacer element which is enveloped by the formed as a membrane-like piece. The spacer element would have a first spacer element side configured to define a channel so that the membrane piece is configured to provide the channel opening to the fluid flow. A second spacer element side is disposed opposite the first spacer element side and adapted to abut the outer seal retainer member. In lieu of a spacer element, the membrane could envelope a pair of bellville springs which are in contact at respective outer peripheral edges and are operative to bias the membrane coaxially outwardly.

Yet another alternative would be that the inner seal member is an elastomer extrusion. The elastomer extrusion could include a spring part which is embedded in the elastomer extrusion. The elastomer extrusion has an outer extruded wall and the inner seal retainer portion of the outer seal retainer member would include an inner seal retainer wall whereby the outer extruded wall of the elastomer extrusion and the inner seal retainer wall of the outer seal member abut each other.

It is preferable that the inner seal member be fabricated from a corrosion-resistant material. The particular corrosion-resistant material is selected from a group consisting of: polymers, polytetrafluorethylene, polyetheretherketone, perfluorelastomers, stainless steel alloys and titanium alloys. The outer seal retainer member is preferably fabricated from a rigid material. Although other configurations can be employed, it is preferable that the inner seal member and the outer seal retainer member are annular in shape.

These and other objects of the present invention will become more readily appreciated and understood from a consideration of the following detailed description of the preferred exemplary embodiment when taken together with the accompanying drawings, in which:

DETAILED DESCRIPTION OF THE EXEMPLARY EMBODIMENTS

The present invention generally concerns seal devices which may be inserted between joint connections in a flow line system and is specifically directed to seal devices which are corrosion resistant and affected by hydrodynamic and hydrostatic forces of the fluid contained in a flow line system. It should be appreciated, however, that the seal device technology described herein could be used for seal device applications other than in flow lines. While the exemplary embodiments of the present invention are further described with respect to an annular seal device to be interposed and compressed between flanged-end connections of adjacent pipe sections, it should be understood at the outset of this description that the features and benefits encompassed in the present invention may be applied to seal devices having other configurations, other flow line applications and other joint connections. For example, the features and benefits of the seal device of the present invention may be applied to a seal device to be interposed and compressed between an oil pan and block of an internal combustion engine. One of ordinary skill in the art should readily be able to implement the features and benefits described with respect to the present invention in numerous situations requiring the use of seal devices.

Figures 1, 2, 3:
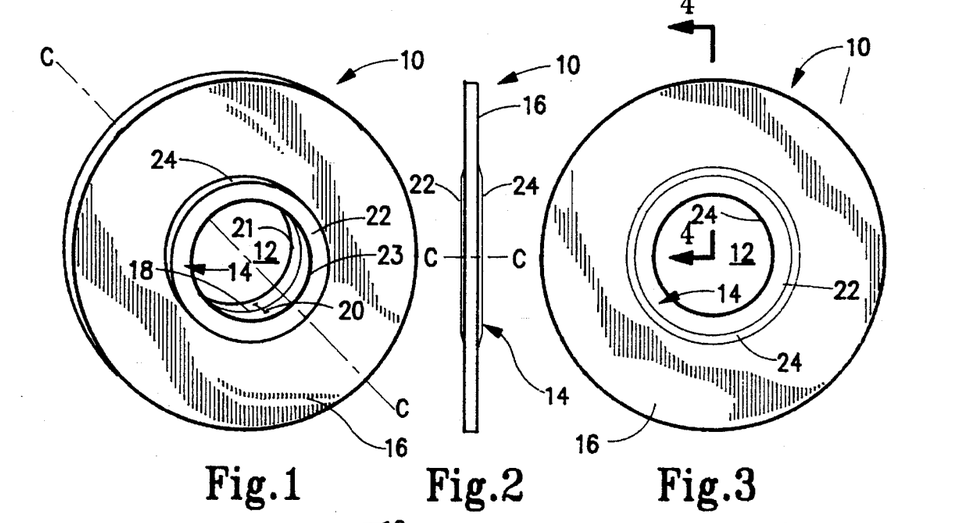
FIG. 1 is a perspective view of a seal device according to a first exemplary embodiment of the present invention.
FIG. 2 is a side view in elevation of the seal device shown in FIG. 1.
FIG. 3 is a front and rear view in elevation of the seal device shown in FIGS. 1 and 2.
Figure 4:
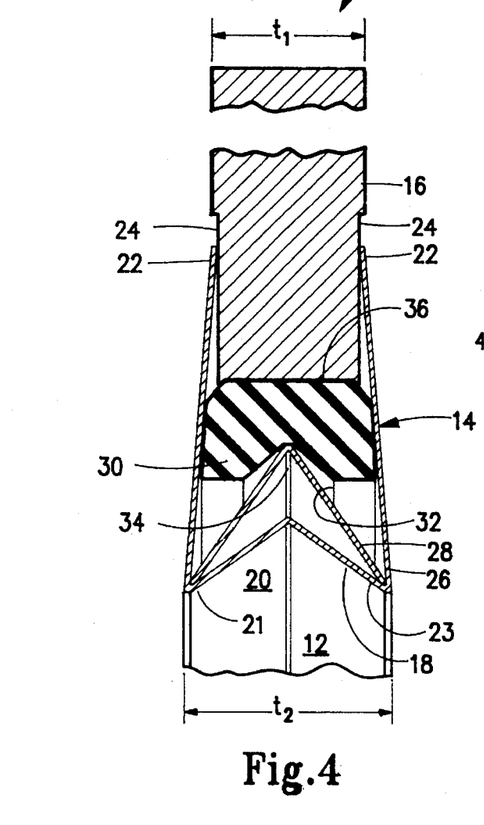
FIG. 4 is an enlarged view in cross-section taken along lines 4—4 of the seal device shown in FIG. 3 in a relaxed state.
Figure 5:
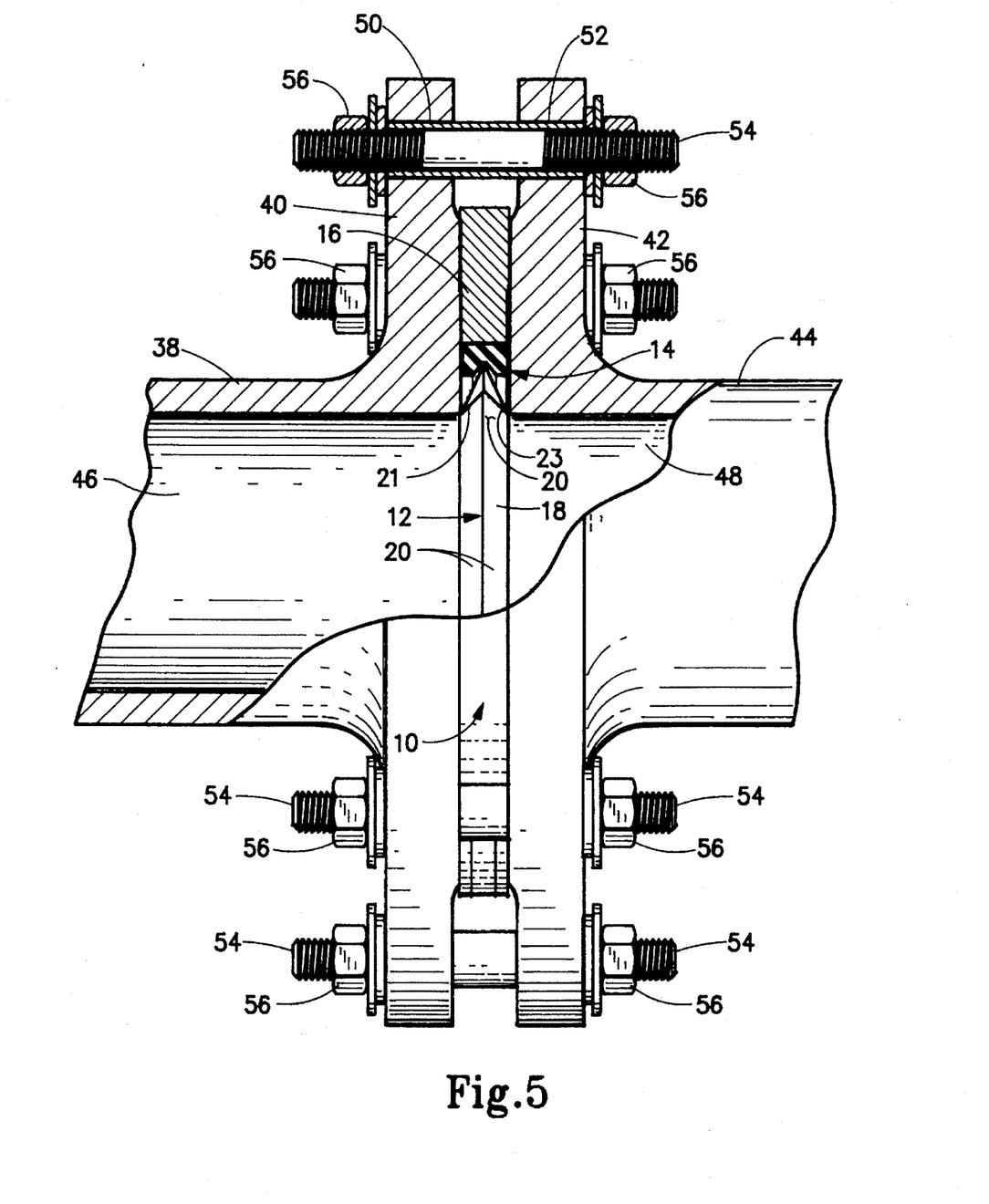
FIG. 5 is a side view in elevation, partially broken-away, showing the seal device of FIGS. 1–4 interposed and compressed between a pair of pipe sections in a flow line according to the first exemplary embodiment of the present invention.
Figure 6:
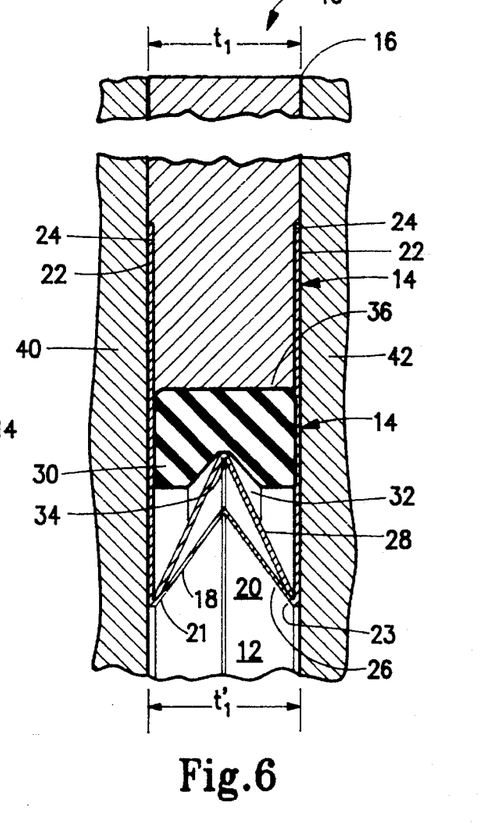
FIG. 6 is an enlarged partial view in cross-sectional of the seal device of FIG. 5 interposed and compressed into a compressed state between the pair of pipe sections in the flow line.
Figure 7:
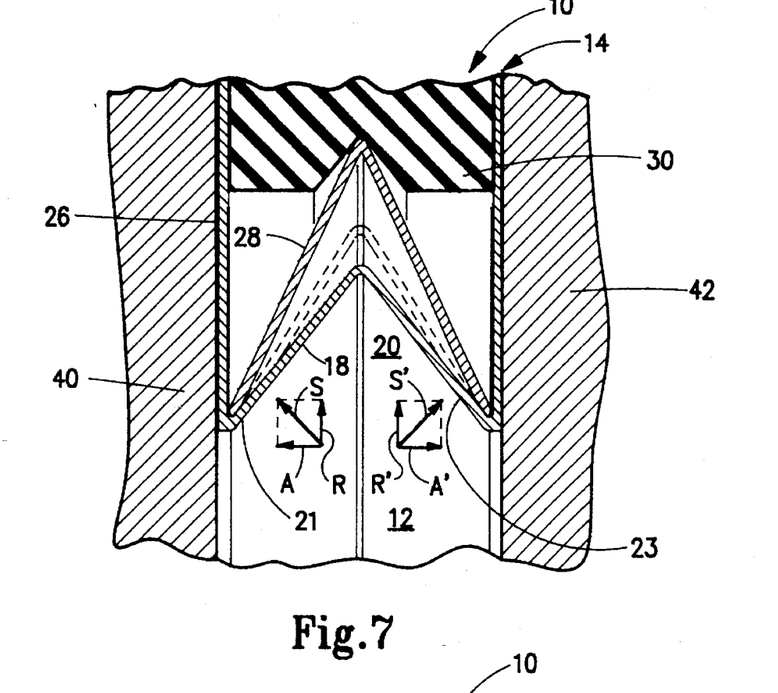
FIG. 7 is an enlarged partial view in cross-section of the seal device shown in FIGS. 5 and 6 depicting the operation of the seal device when the fluid contained within the flow line is in a hydrostatic state.
Figure 8:
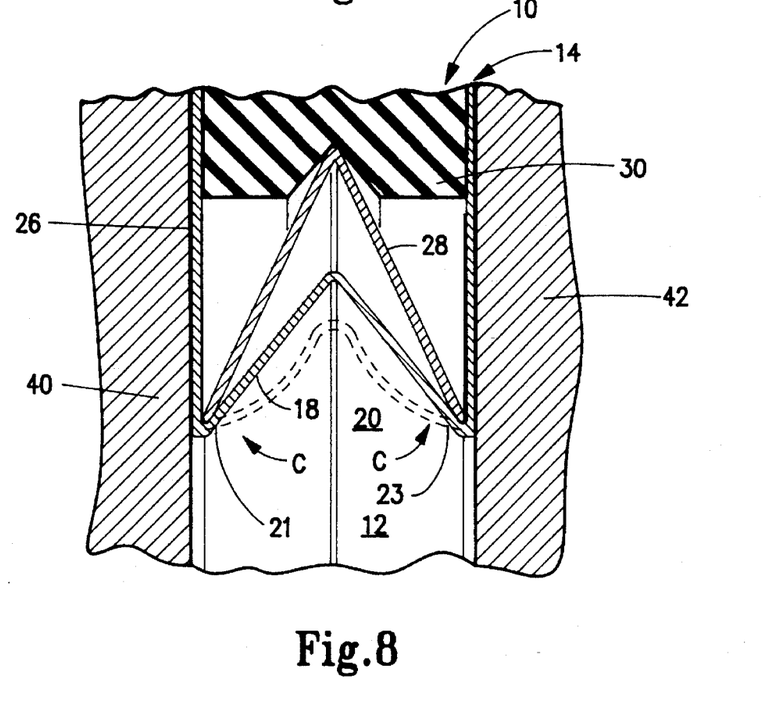
FIG. 8 is an enlarged partial view in cross-section of the seal device shown in FIGS. 5 and 6 depicting the operation of the seal device when the fluid contained within the flow line is in a hydrodynamtic state.

A first exemplary embodiment of an annular seal device according to the present invention is generally shown in FIGS. 1–8. When not in use, that is, in a relaxed state, the seal device is best shown in FIGS. 1–4. When in use, that is, in a compressed state the seal device is best shown in FIGS. 5–6. FIGS. 7 and 8 illustrate a general theory how the seal device of the present invention operates when compressed and when fluid is present in the flow line. As shown in these Figures, seal device 10 has a shape of an annulus having a circular central opening 12 which extends therethrough about a central axis "C" which also represents the direction of fluid flow.

In its broadest form, annular seal device 10 comprises an annular inner seal member 14 and an annular outer seal retainer member 16. Annular inner seal member 14 is W-shaped in cross-section and thus has a channel structure 18 that provides a channel opening 20 which faces circular central opening 12 and extends therearound. Annular inner seal member 14 also is configured to provide a pair of lip structures 21 and 23 which are disposed opposite of each other and extend around an inner annular portion of annular inner seal member 14. Annular outer seal retainer member 16 surrounds annular inner seal member 14.

As shown in FIG. 4, annular outer seal retainer member 16 has a select outer seal retainer member thickness "$t_1$" and annular inner seal member 14 has a select inner seal member thickness "$t_2$" which is greater than the outer seal retainer member thickness "$t_1$" when in the relaxed state. The inner seal member thickness "$t'_2$" is substantially equal to the outer seal retainer member thickness "$t_1$" when interposed and compressed into a compressed state between the joined pieces in the flow line.

The annular inner seal member 14 includes an outer seal portion 22 and annular outer seal retainer member 16 includes an inner seal retainer portion 24 which is adapted to contact outer seal portion 22 of annular inner seal retainer member 14. Annular inner seal member 14 in this first exemplary embodiment includes a seal jacket element 26, a spring element 28 and a spacer element 30. Seal jacket element 26 is adapted to grip inner seal retainer portion 24 of outer seal retainer member 16. For purposes of the first exemplary embodiment of the present invention, seal jacket element 26 is fabricated from a metal or metal alloy. If the first exemplary embodiment of the seal device 10 is to be used in a highly corrosive environment, a corrosion-resistant metal such as stainless steel, stainless steel alloys, titanium or titanium alloys can be used.

Spring element 28 is disposed within and around seal jacket element 26 and is operative to bias seal jacket element 26 coaxially outwardly. Spring element 28 is configured in cross section as a V-shape. Spacer element 30 is disposed within and annularly around seal jacket element 26. Spacer element 30 has a first side 32 which is adapted to receive a spring vertex portion 34 of V-shaped spring element 28. Spacer element 30 has a second side 36 which is positioned opposite first side 32 of spacer element 30 and is adapted to abut annular inner seal retainer portion 24 of annular outer seal retainer member 16. Spacer element 30 is sized to provide a resilient force coaxially outwardly against annular inner seal member 14 when compressed.

Annular seal device 10 is adapted to be interposed and compressed between joined pieces in a flow line that is operative to convey a flowing fluid. First, for purposes of example, annular seal device 10 is shown in FIG. 5 as being interposed in a flanged-end connections between two adjacent sections of pipe. With reference to FIG. 5 then, it may be seen that a first section of pipe 38 has a first annular flange 40 which is adapted to be placed in opposed, facing relation with a second annular flange 42 of a second section of pipe 44. First section of pipe 38 has an interior passage way 46 which is axially aligned with a second interior passageway 48 of second section of pipe 44. First annular flange 40 is provided with a plurality of bolt openings 50 which axially align with bolt openings 52 of second annular flange 42 in order to receive connecting tie-rods or bolts 54 which, in turn, receive nuts 56 to compressively join first and second sections of pipe 38 and 44 together. It may also be appreciated in reference to FIG. 5 that annular seal device 10 is adapted to be compressed between the first and second annular flanges 40 and 42 so as to seal the joint between first and second sections of pipe 38 and 44 thereby preventing leakage of the fluid contained in the flow line. To this end, it may be seen that circular central opening 12 of annular seal device 10 is sized to similarly align with first and second interior passageways 46 and 48 to permit the fluid to flow therethrough.

Annular inner seal member 14 and annular outer seal retainer member 16 are sized and adapted to seal a space between joined pieces of pipe to allow fluid to flow therethrough without leakage. Additionally, annular inner seal member 14 is operative to prevent contact of the fluid with annular outer seal retainer member 16 when interposed and compressed between joined pieces of pipe. Thus, it is not necessary that outer seal retainer member 16 be fabricated from a corrosion resistant material when the annular seal device 10 is used in a highly corrosive environment. It is preferred, however, that outer seal retainer member 16 be fabricated from a rigid material selected from a group of materials consisting of metal and glass-reinforced epoxy which resist compression forces. Thus, annular outer seal retainer member 16 acts as a compression limiter so that regardless of the amount of torque applied to nuts 56 on bolts 54, over-torqueing will not destroy the sealing properties of annular inner seal member 14. Therefore, one ordinary skill in the art would appreciate that, with reference to FIG. 6, inner seal member thickness "$t'_2$" becomes substantially equal to outer seal retainer member thickness "$t_1$" when annular seal device 10 is interposed and compressed between the joined pieces in the flow line.

It follows then that each of lips 21 and 23 operates to apply a sealing force against the joined pieces, i.e. first and second circular flanges 40 and 42 respectively, when annular seal device 10 is interposed and compressed therebetween. This sealing force is generated in three ways. First, compressing annular inner seal member 14 from its greater thickness "$t_2$" to its lesser thickness "$t'_2$" generates a resilient sealing force at the lips 21 and 23 against the joint pieces. Second, spring element 28 which is resiliently biased coaxially outwardly has also been compressed which, in turn, applies yet a supplemental sealing force to the pair of lips 21 and 23 against first and second circular flanges 40 and 42 respectively. Finally, any radially outward pressure from the fluid carried by the flow line will exert an axial component pressing lips 21 and 23 against the flanges of the joined pieces.

One of ordinary skill in the art should appreciate now that either the hydrostatic forces or hydrodynamic forces exerted by the fluid itself actually enhances the sealing properties of annular seal device 10. Furthermore, any requirement of precision in the torque used to compress annular seal device 10 between joined pieces of pipe are now less critical because the outer seal retainer member 16 is fabricated from a rigid material that, in practice, limits the amount of compression force on annular inner seal member 14. Also, because annular seal device 10 deforms mechanically as well as within its inherent modulus of elasticity characteristics, it is expected that annular seal device 10 can be re-used without loss of its performance. Additionally, since annular seal device 10 employs both mechanical resilient properties as well as inherent modulus of elasticity properties of the material, it is believed that annular seal device 10 could be unaffected by cycles of expansion and contraction caused by fluctuations of temperature and/or pressure.

Figure 9:
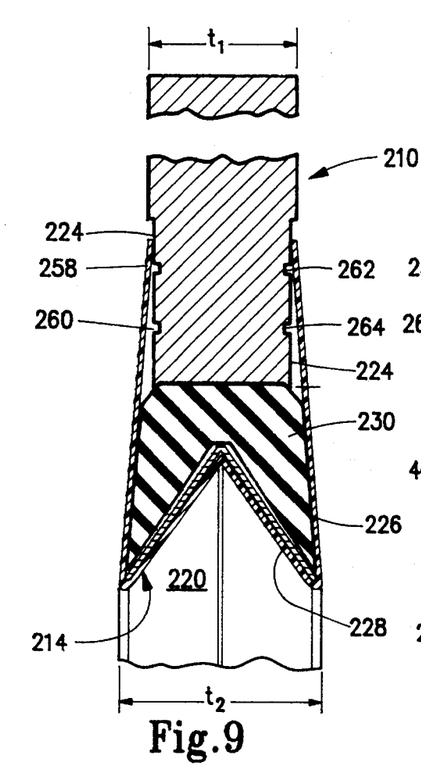
FIG. 9 is an enlarged partial view in cross-section of a seal device according to a second exemplary embodiment of the present invention in a relaxed state and showing a seal jacket element fabricated from a polymer material.
Figure 10:
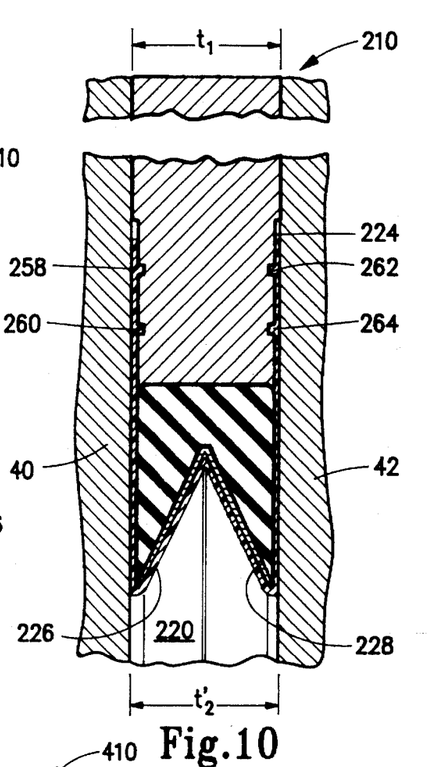
FIG. 10 is an enlarged partial view in cross-section showing the second exemplary embodiment of the present invention shown in FIG. 9 interposed and compressed into a compressed state between joined pieces of the flow line.

A second exemplary embodiment of an annular seal device 210 of the present invention is shown in FIGS. 9 and 10. An inner seal retainer portion 224 includes a first pair of spaced apart grooves 258 and 260 which extends circumferentially along a first side of inner seal retainer portion 224 and a second pair of spaced apart grooves 262 and 264 which extend circumferentially about a second side of inner seal retainer portion 224. A seal jacket element 226 is W-shaped in cross-section and is fabricated from a polymeric material, such as polytetrafluorethylene, which is generally considered anti-corrosive in nature. Note that seal jacket element 226 is contoured to contact a V-shaped spring element 228 thereby defining channel opening 220. This is advantageous because some polymeric materials such as polytetrafluorethylene can become gum-like at temperatures of 350° F. and above. In a hydrostatic state, intimate contact of the seal jacket element 226, which is fabricated from selected polymetric material, with spring element 228 assures that radial force R generated from the fluid contained in the flow line will not cause seal jacket element 226 to expand and subsequently rupture. Also, spacer element 230 occupies substantially all empty space between inner seal retainer portion 224 and spring element 228. When annular seal device 210 is compressed between first and second circular flanges 40 and 42, as shown in FIG. 10 the polymeric material of seal jacket element 226 tends to flow into spaced-apart grooves 258, 260, 262 and 264. Seal jacket element 226 along with spring element 288 and spacer element 230 form an inner seal member 214.

Figures 11, 12, 13:
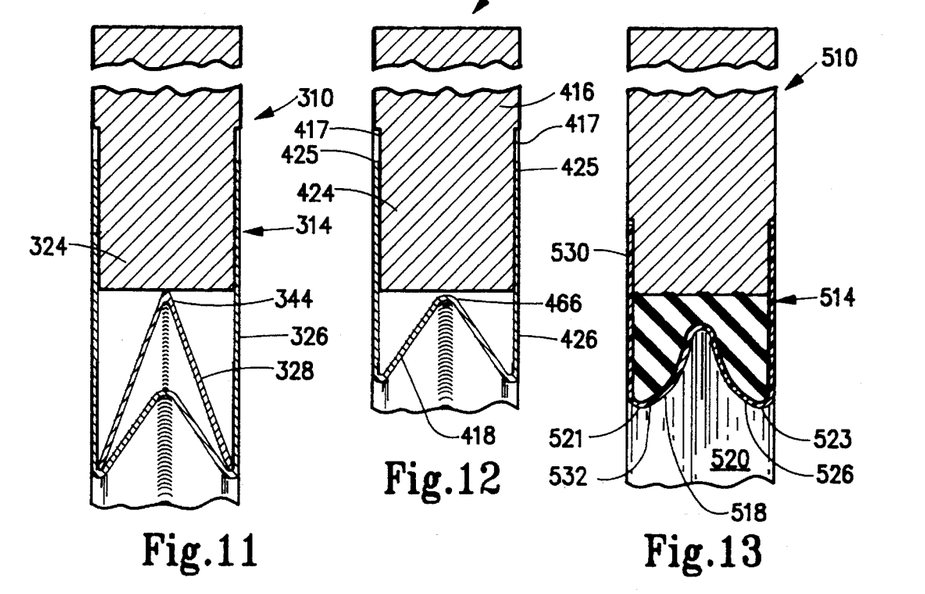
FIG. 11 is an enlarged partial view in cross-section showing a third exemplary embodiment of the present invention similar to FIG. 4 but without a spacer element and shown in a compressed state.
FIG. 12 is an enlarged partial view in cross-section similar to FIG. 11 but without a V-shaped spring element.
FIG. 13 is an enlarged partial view in cross-section of a fifth exemplary embodiment of the present invention employing a elastomeric spacer element and a polymeric seal jacket element.

A third exemplary embodiment of an annular seal device 310 of the present invention is shown in FIG. 11. Here, an annular inner seal member 314 includes a seal jacket element 326 fabricated from metal and a spring element 328 also fabricated from metal. A spring vertex portion 344 abuts an inner seal retainer portion 324. If this third exemplary embodiment was required for use in a highly corrosive environment, seal jacket element 326 could be fabricated from stainless steel, stainless steel alloys, titanium or titanium alloys which are also generally considered anti-corrosive metals. In a slightly corrosive or non-corrosive environment, any suitable metal compatible with the fluid can be selected.

A fourth exemplary embodiment of the present invention is shown in FIG. 12. A seal jacket element 426 fabricated from metal grips an inner seal retainer portion 424 of an annular outer seal retainer member 416. A vertex portion 466 of a channel structure 418 abuts inner seal retainer portion 424, and edges 425 of channel structure 418 contact shoulders 417 of retainer member 416 when in the compressed state.

A fifth exemplary embodiment of an annular seal device 510 of the present invention is shown in FIG. 13. Annular inner seal member 514 includes a seal jacket element 526 fabricated from a polymeric material and a spacer element 530 which is fabricated from an elastomeric material. Spacer element 530 has a first spacer element side 532 which is configured in a manner to define channel structure 518 which is formed to define channel opening 520. Annular inner seal element 514 also includes a pair of lips 521 and 523.

Figures 14, 15, 16:
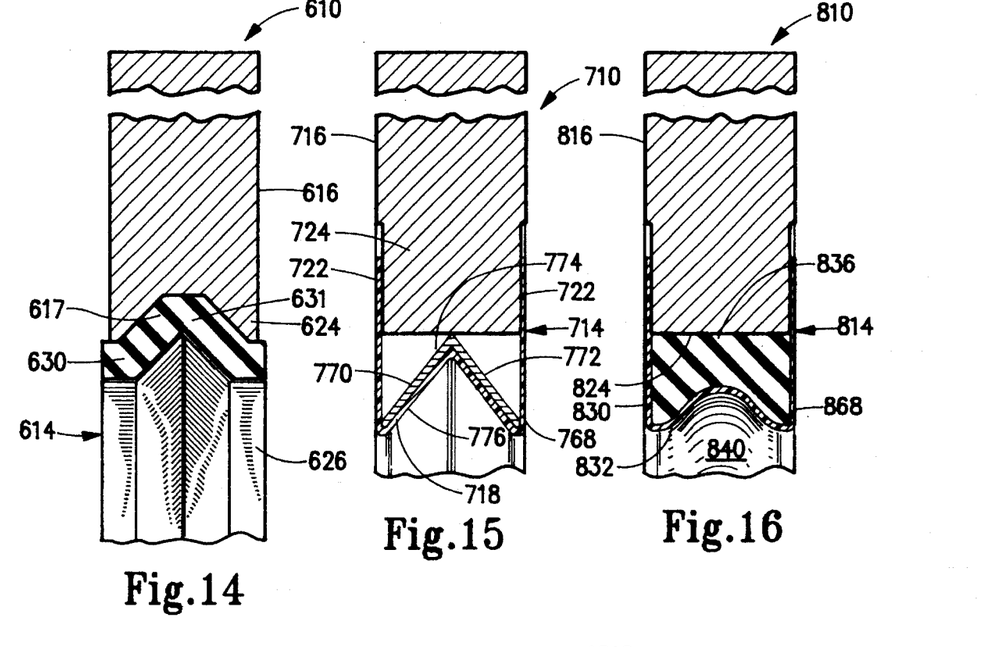
FIG. 14 is an enlarged partial view in cross-section of a sixth exemplary embodiment of the present invention having an elastomeric spacer element which matably receives a seal jacket element fabricated from metal.
FIG. 15 is an enlarged partial view in cross-section of a seventh exemplary embodiment of the present invention showing a spring element as a pair of bellville springs and a seal jacket element as a polymeric membrane.
FIG. 16 is an enlarged partial view in cross-section of an eighth exemplary embodiment of the present invention showing an elastomeric spacer element configured to define a channel opening and a seal jacket element as a polymeric membrane.

A sixth exemplary embodiment of an annular seal device 610 is shown in FIG. 14. An annular inner seal member 614 includes a seal jacket element 626 fabricated from metal, and a thick V-shaped spacer element 630 is fabricated from an elastomeric material. An inner seal retainer portion 624 of an annular outer seal retainer member 616 is formed to have a groove 617 configured similarly to vertex portion 631 of spacer element 630 so that spacer element 630 is matably received therein.

A seventh exemplary embodiment of an annular seal device 710 of the present invention is shown in FIG. 15. An annular inner seal member 714 is shown to include a membrane 768 and a pair of bellville springs 770 and 772. One of ordinary skill in the art would appreciate that a common bellvilles 770 or 772 are frustoconical washer-like devices. The pair of bellvilles 770 and 772 are in contact at respective outer peripheral edges 774 and are operative to bias membrane 768 coaxially outwardly. Membrane 768 has an outer seal portion 722 which contacts an inner seal retainer portion 724 of annular outer seal retainer member 716. Channel structure 718 contacts an outer surface area 776 of the pair of bellvilles 770 and 772.

An eighth exemplary embodiment of annular seal device 810 of the present invention is shown in FIG. 16. Here, an annular inner seal member 814 includes a membrane 868 which is typically fabricated from a relatively thin, pliable polymeric material again such as polytetrafluroethylene and a spacer element 830 which is fabricated from an elastomeric material. Spacer element 830 is enveloped by membrane 868. Spacer element 830 has a first spacer element side 832 which is configured to define a channel opening 820 and has a second spacer element side 836 which is disposed opposite first spacer element side 832 and is adapted to abut an inner seal retainer portion 824 of an outer seal retainer member 816.

Figures 17, 18, 19:
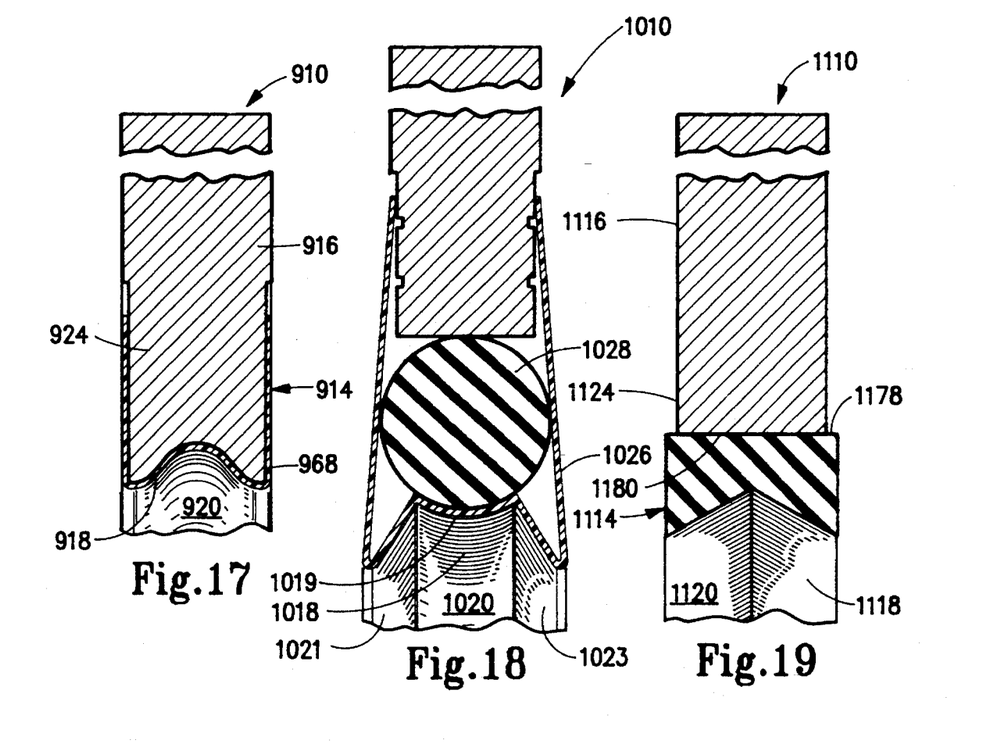
FIG. 17 is an enlarged partial view in cross-section of a ninth exemplary embodiment of the present invention showing an inner seal retainer portion of an outer seal retainer configured to define a channel opening and a seal jacket element as a polymeric membrane.
FIG. 18 is an enlarged partial view in cross-section of a tenth exemplary embodiment of the present invention showing a spacer element as an elastomeric O-ring and a seal jacket element as a polymeric material.
FIG. 19 is an enlarged partial view in cross-section of an eleventh exemplary embodiment of the present invention showing an inner seal member which is extruded from an elastomeric material and configured to define a substantially V-shaped channel opening.

A ninth exemplary embodiment of an annular seal device 910 is shown in FIG. 17. An annular inner seal member 914 is a membrane 968 which is typically fabricated from a relatively thin, pliable anti-corrosive polymeric material. An inner seal retainer portion 924 of an annular outer seal member 916 is formed to define a channel opening 920. A channel structure 918 of membrane 968 is adapted to conform to the configuration of inner seal retainer portion 924. It may be appreciated that this embodiment eliminates the spacer element.

A tenth exemplary embodiment of an annular seal device 1010 of the present invention is depicted in FIG. 18. A seal jacket element 1026 is fabricated from a polymeric material. A spring element 1028 is an O-ring which is fabricated from an elastomeric material. Spring element 1028 extends within and circumferentially around seal jacket element 1026. Channel structure 1018 is located between a pair of lips 1021 and 1023 and has an arcuate central portion 1019 shaped at a radius to conform with the curvature of the circular cross-section of spring element 1028 to define a channel opening 1020.

An eleventh exemplary embodiment of an annular seal device 1110 is shown in FIG. 19. An annular inner seal member 1114 is an elastomer extrusion and has an outer extruded wall 1178. An inner seal retainer portion 1124 of an annular outer retainer seal member 1116 includes an inner seal retainer wall 1180. Outer extruded wall 1178 of the elastomer extrusion and inner seal retainer wall 1180 of inner seal retainer portion 1124 abut each other. A V-shaped structure 1118 forms V-shaped channel opening 1120.

Figures 20, 21, 22:
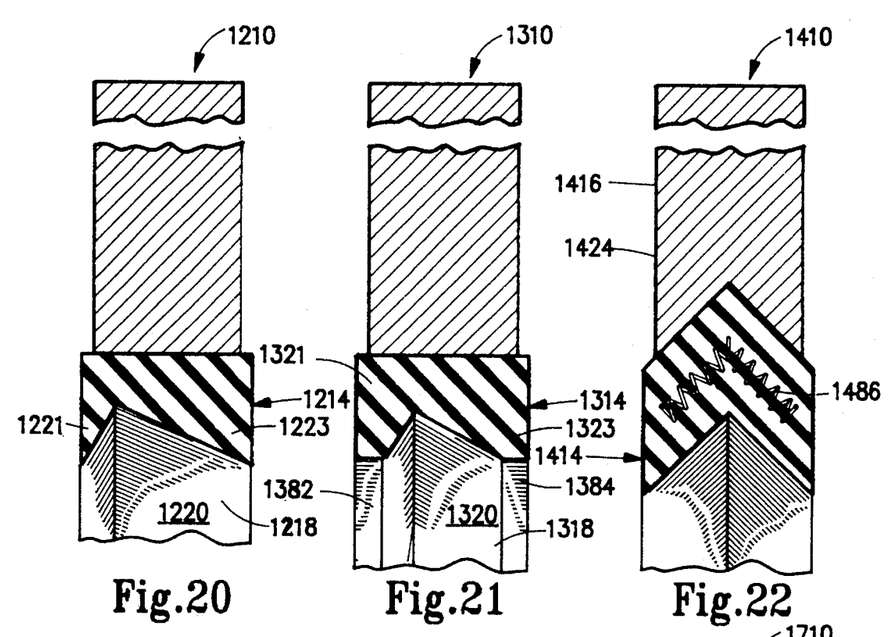
FIG. 20 is an enlarged partial view in cross-section of a twelfth exemplary embodiment of the present invention showing an inner seal member extruded from an elastomeric material and configured to define a skewed V-shaped channel opening.
FIG. 21 is an enlarged partial view in cross-section of a thirteenth exemplary embodiment of the present invention showing an inner seal member extruded from an elastomeric material and configured to defined a truncated and skewed V-shaped channel opening.
FIG. 22 is an enlarged partial view in cross-section of a fourteenth exemplary embodiment of the present invention showing a seal jacket element fabricated from an elastomeric extrusion molded around a spring element.

A twelfth exemplary embodiment of an annular seal device 1210 of the present invention is depicted in FIG. 20.

An annular inner seal member 1214 is an elastomer extrusion similar to the annular inner seal member 1114 shown in FIG. 19. The only difference is that a channel structure 1218 forms a skewed V-shaped channel opening 1220. Lip structures 1221 and 1223 are integrally formed on inner seal member 1214.

A thirteenth exemplary embodiment of an annular seal device 1310 of the present invention is depicted in FIG. 21. An annular inner seal member 1314 is an elastomer extrusion similar to the annular inner seal member 1114 of FIG. 19 and annular seal member 1214 of FIG. 20. A channel structure 1318 defines a skewed V-shaped channel opening 1320 which is positioned between a pair of annular walls 1382 and 1384. Here, the lip structures 1321 and 1323 are truncated.

A fourteenth exemplary embodiment of an annular seal device 1410 is depicted in FIG. 22. An annular inner seal member 1414 is an elastomer extrusion which includes a spring part 1486 adapted to be embedded in, i.e., to extend within and around, the elastomer extrusion. Annular inner seal member 1414 is substantially V-shaped and, as a result, an inner seal retainer portion 1424 of annular outer seal retainer member 1416 is configured to receive the V-shaped elastomer extrusion in a mated relationship.

Figures 23, 24, 25:
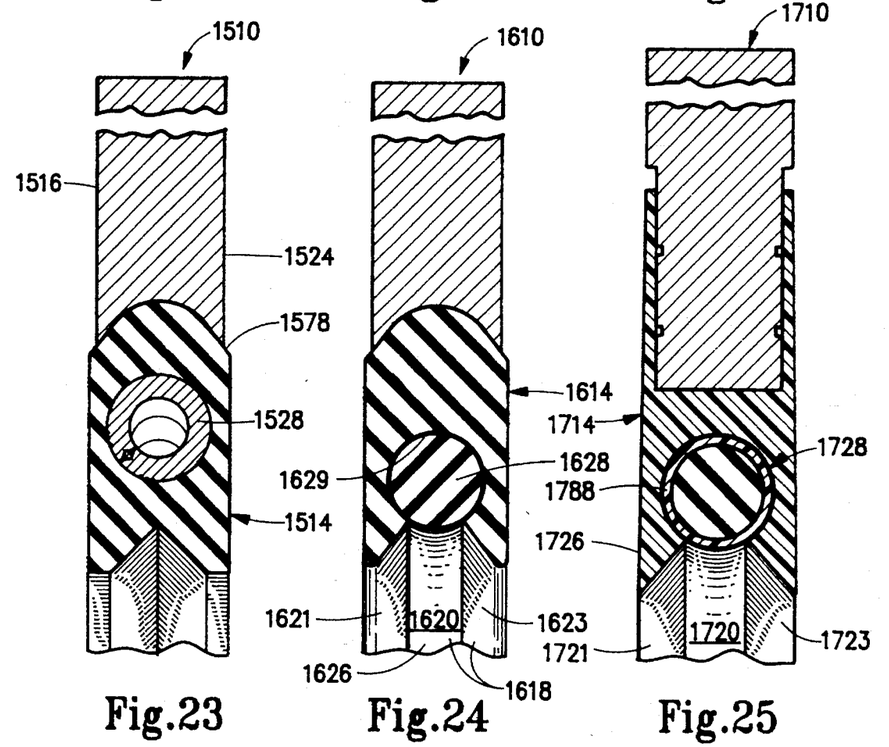
FIG. 23 is an enlarged partial view in cross-section of a fifteenth exemplary embodiment of the present invention showing an inner seal member molded around a spring element.
FIG. 24 is an enlarged partial view in cross-section of a sixteenth exemplary embodiment of the present invention showing a seal jacket element as an elastomeric extrusion and a spring element formed as an elastomeric O-ring in combination the configuration of a channel opening.
FIG. 25 is an enlarged partial view in cross-section of a seventeenth exemplary embodiment of the present invention showing a polymeric seal jacket element and a spring element as an elastomeric O-ring coated in a polymeric material which form in combination the configuration of a channel opening.

A fifteenth exemplary embodiment of an annular seal device of the present invention is depicted in FIG. 23. An annular inner seal member 1514 is an elastomer extrusion having a coil spring element 1528 embedded in the elastomer extrusion. When the elastomer extrusion is viewed in cross-section, an extruded wall 1578 forms a U-shape. An inner seal retainer portion 1424 of an annular outer seal retainer member 1516 is adapted to matably receive the elastomer extrusion and contact extruded wall 1578.

A sixteenth exemplary embodiment of an annular seal device 1610 of the present invention is depicted in FIG. 24. An annular inner seal member 1614 is an elastomer extrusion which includes an elastomeric O-ring extending circumferentially within and around a groove 1629 in the elastomer extrusion. A channel structure 1618 includes a pair of lips 1621 and 1623 and an arcuate portion 1686 of O-ring element 1628 which, in combination, define channel opening 1620.

A seventeenth exemplary embodiment of an annular seal device 1710 of the present invention is depicted in FIG. 25. An annular inner seal member 1714 includes a seal jacket element 1726 fabricated from a polymeric material such as polytetrafluroethylene and a spring element 1728. Spring element 1728 is an elastomeric O-ring which is enclosed in a coating 1788 of a polymeric material such as polytetrafluroethylene to protect against corrosive fluids. A channel structure 1718 includes a pair of lips 1721, 1723 and a portion 1786 of spring element 1728 which, in combination, define channel opening 1720.

Figure 26:
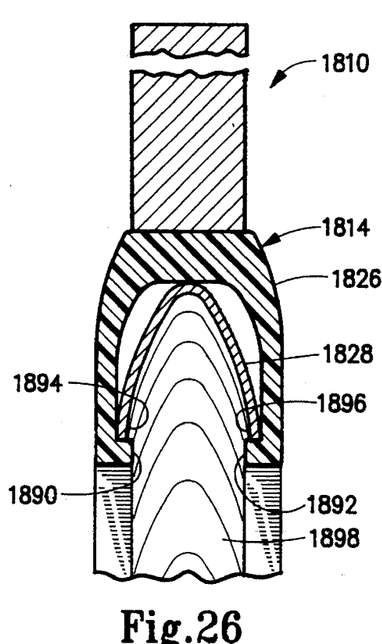
FIG. 26 is an enlarged partial view in cross-section of an eighteenth exemplary embodiment of the present invention showing a seal jacket element fabricated from a polymeric material and a spring element which form in combination the configuration of the channel opening.

An eighteenth exemplary embodiment of an annular seal device 1810 is depicted in FIG. 26. An annular inner seal member 1814 includes a seal jacket element 1826 fabricated from an anti-corrosive polymeric material, and a spring element 1828 which is a V-shaped finger spring. Alternatively, spring element 1828 could be configured in cross-section as a U-shape. Seal jacket element 1826 is adapted to receive spring element 1828 which extends within and circumferentially about seal jacket element 1826. A pair of shoulders 1890 and 1892 are operative to retain a pair of inner peripheral edges 1894 and 1896 of spring element 1828. A channel opening 1820 is substantially defined by an inner arcuate surface 1898 of spring element 1828 that extends circumferentially therearound. If this exemplary embodiment of the present invention is to be used in a corrosive environment, spring element 1828 is fabricated from a corrosive resistant material such as stainless steel, stainless steel alloys, titanium or titanium alloys.

In a high temperature environment, a special problem is presented when particular types of polymeric material such as polytetrafluorethylene are used for fabrication of the seal jacket element. As stated above, these polymeric materials can become gum-like at temperatures of 350° F. and above. When this occurs, the lip structures tend to flow into the central opening, thus causing either diminished sealing capability or complete sealing failure. To overcome this problem, an inner retainer member as shown in FIGS. 27–29 can be used to prevent the polymeric seal jacket element from flowing into the channel opening when placed in a high temperature environment.

Figure 27:
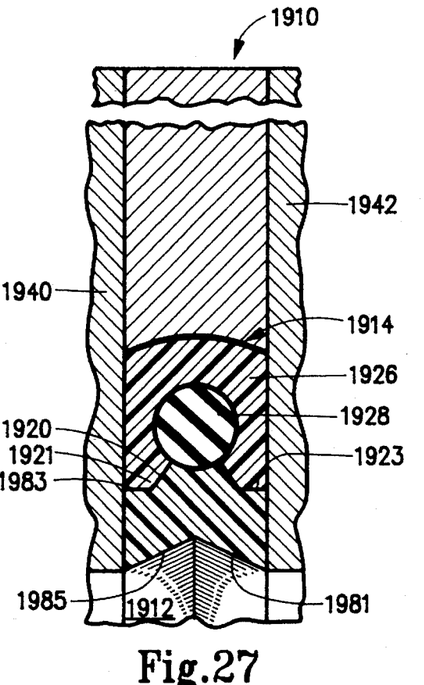
FIG. 27 is an enlarged partial view in cross-section of a nineteenth exemplary embodiment of the present invention showing a seal jacket element fabricated from a polymeric material with an O-ring and with an inner seal retainer member that forms the channel opening.

A nineteenth exemplary embodiment of an annular seal device 1910 interposed and compressed between a first annular flange 1940 and a second annular flange 1942 is shown in FIG. 27. An annular inner seal member 1914 includes a polymeric seal jacket element 1926, a spring element 1928 being an elastomeric O-ring and an inner retainer member 1981. Inner retainer member 1981 has a first inner retainer side 1983 which is adapted to be received into a channel opening 1920 and operative to contact lip structures 1921 and 1923. Inner retainer member 1981 has a second inner retainer side 1985 which is opposite first inner retainer side 1983 and is oriented toward a central opening 1912. It is preferred that inner retainer member 1981 is annular in configuration.

Figure 28:
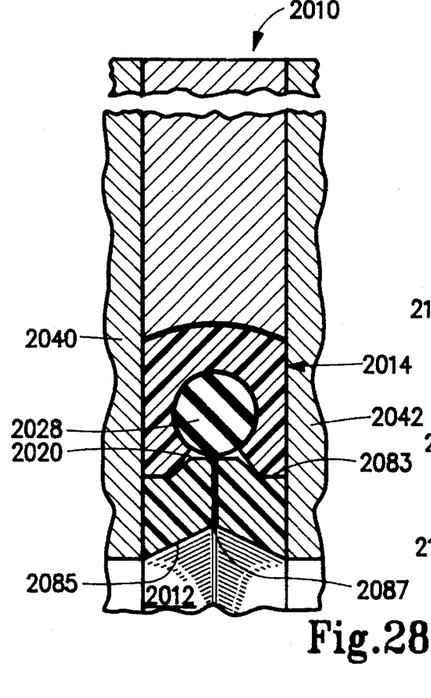
FIG. 28 is an enlarged partial view in cross-section of a twentieth exemplary embodiment of the present invention showing a seal jacket element fabricated from a polymeric material with an O-ring and with an inner seal retainer member that forms the channel opening with the inner seal retainer member having radial passageways therethrough.

A twentieth exemplary embodiment of an annular seal device 2010 interposed and compressed between a first annular flange 2040 and a second annular flange 2042 is shown in FIG. 28. An annular inner seal member 2014 includes a polymeric seal jacket element 2026, a spring element 2028 being an elastomeric O-ring and an inner retainer member 2081, which is substantially similar to annular seal device 1910 shown in FIG. 27. A difference between these two exemplary embodiments is that a plurality of spaced apart, radially extending passageways, such as passageway 2087 extend between a first inner retainer side 2083 and a second inner retainer side 2085. Preferably, these passageways are equiangularly spaced around inner retainer member 2081, and the purpose of these passageways is to allow fluid communication between a channel opening 2020 and a central opening 2012.

Figure 29:
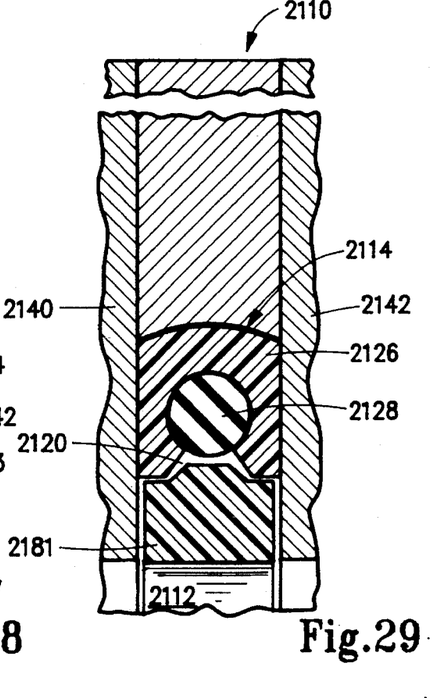
FIG. 29 is an enlarged partial view in cross-section of a twenty-first embodiment of the present invention that is similar to FIG. 27 but with the inner seal retainer member sized to float even when the seal device is in the compressed state.

A twenty-first exemplary embodiment of an annular seal device 2110 interposed and compressed between a first annular flange 2140 and a second annular flange 2142 is shown in FIG. 29. An annular inner seal member 2114 includes a polymeric seal jacket element 2126, a spring element 2128 being an elastomeric O-ring and an inner retainer member 2181. Note that although annular inner seal member 2114 is compressed between first and second annular flanges 2140 and 2142, inner retainer member 2181 is permitted to "float" therebetween. Permitting inner retainer member 2181 to "float" between first and second annular flanges 2140 and 2142 allows the fluid to communicate between a channel opening 2120 and a central opening 2112.

From the exemplary embodiments described above, one of ordinary skill in the art would appreciate the versatility of the present invention. Now, a seal device can be fabricated in accordance with specific performance requirements depending upon, inter alia, temperature, pressure and corrosive nature of the fluid contained in the flow line. Particularly, when a seal device is required in a corrosive environment, corrosion resistant materials, such as polymers e.g., Polytetrafluorethylene, stainless steel, stainless steel alloys, titanium or titanium alloys can be used. Depending upon other design criteria, such as temperature and pressure, a specific one or perhaps several of the above-described exemplary embodiments may be optimally suitable for that particular application.

Accordingly, the present invention has been described with some degree of particularity directed to the exemplary embodiments of the present invention. It should be appreciated, though, that the present invention is defined by the following claims construed in light of the prior art so that modifications or changes may be made to the exemplary embodiments of the present invention without departing from the inventive concepts contained herein.

I claim:

1. A seal device adapted to be interposed and compressed between joined pieces in a flow line that is operative to convey a flowing fluid, comprising:
    (a) a seal member having a central opening extending therethrough to accommodate the flow of said fluid, said seal member having a channel structure that provides a channel opening facing said central opening and extending therearound and a pair of lips disposed opposite each other and extending around a peripheral portion of said inner seal member located radially inwardly thereof, said lips operative to apply a sealing force against the joined pieces when interposed and compressed therebetween;
    (b) a seal retainer member surrounding said seal member and located radially outwardly thereof relative to the central opening to form a region therebetween, said seal member and said seal retainer member sized and adapted to be compressed from a relaxed state to seal a space between the joined pieces in said flow line when interposed and compressed into a compressed state between the joined pieces to allow fluid to flow therethrough, said seal member operative to prevent contact of said fluid with said seal retainer member when interposed and compressed between the joined pieces; and
    (c) a resilient member disposed in the region between said annular seal member and said annular retainer member and operative to bias said pair of lips axially outwardly against the joined pieces when said seal member is compressed between the joined pieces.

2. A seal device according to claim 1 wherein said seal retainer member has a seal retainer member thickness and wherein said seal member has a seal member thickness greater than said seal retainer member thickness when in the relaxed state.

3. A seal device according to claim 2 wherein said seal member thickness is substantially equal to said seal retainer member thickness when the seal is in the compressed state.

4. A seal device according to claim 3 wherein said seal member includes an outer seal portion and wherein said seal retainer member includes an inner seal retainer portion adapted to contact said outer seal portion of said seal member.

5. A seal device according to claim 4 wherein said seal member includes a seal jacket element adapted to grip the inner seal retainer portion of said seal retainer member.

6. A seal device according to claim 5 wherein said resilient member is defined by a spring element disposed within and around said seal jacket element.

7. A seal device according to claim 6 wherein said spring element is configured in cross-section as a V-shape to have a surrounding vertex portion.

8. A seal device according to claim 7 wherein said spring element is a V-shaped finger spring.

9. A seal device according to claim 7 wherein said spring element is a pair of opposed bellville springs being in contact at respective outer peripheral edges thereof to define said surrounding vertex portion.

10. A seal device according to claim 7 wherein said seal member includes a spacer element disposed within and around said seal jacket element, said spacer element having a first side adapted to receive said surrounding vertex portion of said V-shaped spring element and a second side opposite said first side adapted to abut the inner seal retainer portion of said outer seal retainer member.

11. A seal device according to claim 10 wherein said spacer element is resilient and is sized to provide a resilient force coaxially outwardly against said seal member when in the compressed state.

12. A seal device according to claim 6 wherein said spring element is configured in cross-section as a U-shape.

13. A seal device according to claim 6 wherein said spring element is an O-ring.

14. A seal device according to claim 5 wherein said inner seal member includes an inner seal retainer member having a first inner retainer side adapted to be received into said channel opening and operative to contact said lip structures and a second inner retainer side opposite said first inner retainer side oriented toward said central opening.

15. A seal device according to claim 4 wherein said inner seal member is a membrane-like element.

16. A seal device according to claim 15 including a spacer element disposed in said membrane, said spacer element having a first spacer element side configured to define a second channel opening facing said central opening, said membrane-like element extending into said second channel opening and co-extensive therewith to form said first channel opening, and a second spacer element side disposed opposite said first spacer element side and adapted to abut said outer seal retainer member.

17. A seal device according to claim 15 wherein said membrane envelopes a pair of bellville springs which are in contact at respective outer peripheral edges and operative to bias said membrane coaxially outwardly.

18. A seal device according to claim 4 wherein said inner seal member is an elastomer extrusion.

19. A seal device according to claim 18 wherein said elastomer extrusion includes a spring part embedded in said elastomer extrusion.

20. A seal device according to claim 19 wherein said elastomer extrusion has an outer wall and wherein said inner seal retainer portion of said outer seal retainer member includes an inner seal retainer wall whereby said outer wall of said elastomer extrusion and said inner seal retainer wall of said outer seal retainer member are commonly contoured and abut each other.

21. A seal device according to claim 1 wherein said seal member is fabricated from a corrosion-resistant material.

22. A seal device according to claim 21 wherein said corrosion-resistant material is selected from a group consisting of: polymers, polyetheretherketone, perfluorelastomers, polytetrafluorethylene, stainless steel alloys and titanium alloys.

23. A seal device element according to claim 1 wherein said seal retainer member is fabricated from a rigid material.

24. A seal device adapted to be interposed and compressed between joined pieces in a flow line that is operative to convey a flowing fluid, comprising:
    (a) an annular seal member being fabricated from a corrosion-resistant material and having a central opening extending therethrough to accommodate the flow of said fluid, said annular seal member having a channel structure that provides a channel opening facing said central opening and extending therearound and a pair of lips disposed opposite each other and extending around a radially inner annular portion of said seal member, said lips operative to apply a sealing force against the joined pieces when interposed and compressed therebetween;

(b) an annular seal retainer member being fabricated from a rigid material and surrounding said annular seal member and located radially outwardly thereof to form a region therebetween, said annular seal member and said annular seal retainer member sized and adapted to be compressed from a relaxed state to seal a space between the joined pieces in said flow line when interposed and compressed into a compressed state between the joined pieces to allow fluid to flow therethrough, said annular seal member operative to prevent contact of said fluid with said annular seal retainer member when interposed and compressed between the joined pieces; and (c) a resilient member disposed in the region between said annular seal member and said annular retainer member and operative to bias said pair of lips axially outwardly against the joined pieces when said seal member is compressed between the joined pieces.

25. A seal device according to claim 24 wherein said annular seal retainer member has a seal retainer member thickness and wherein said annular seal member has a seal member thickness greater than said seal retainer member thickness when in the relaxed state.

26. A seal device according to claim 25 wherein said seal member thickness is substantially equal to said seal retainer member thickness when in the compressed state.

27. A seal device according to claim 26 wherein said annular seal member includes an outer seal portion and wherein said annular seal retainer member includes an inner seal retainer portion adapted to contact said outer seal portion of said annular seal member.

28. A seal device according to claim 27 wherein said annular seal member includes a seal jacket element fabricated from a corrosion-resistant material and adapted to grip the inner seal retainer portion of said annular seal retainer member.

29. A seal device according to claim 28 wherein said resilient member is defined by a spring element disposed within and around said seal jacket element.

30. A seal device according to claim 29 wherein said spring element is fabricated from a corrosion-resistant material.

31. A seal device according to claim 30 wherein said spring element is configured in cross-section as a V-shape to have a surrounding vertex portion.

32. A seal device according to claim 30 wherein said spring element is a finger spring.

33. A seal device according to claim 30 wherein said spring element is a pair of opposed bellville springs being in contact at respective outer peripheral edges thereof to define said surrounding vertex portion.

34. A seal device according to claim 31 wherein said inner seal member includes a spacer element disposed within and around said seal jacket element, said spacer element having a first side adapted to receive said surrounding vertex portion of said V-shaped spring element and a second side opposite said first side adapted to abut the inner seal retainer portion of said annular seal retainer member.

35. A seal device according to claim 34 wherein said spacer element is resilient and is sized to provide a resilient force coaxially outwardly against said annular seal member when in the compressed state.

36. A seal device according to claim 30 wherein said spring element is configured in cross-section as a U-shape.

37. A seal device according to claim 29 wherein said spring element is an O-ring.

38. A seal device according to claim 27 wherein said inner seal member includes an annular inner retainer member having a first inner retainer side adapted to be received into said channel opening and operative to contact said lip structures and a second inner retainer side opposite said first inner retainer side oriented toward said central opening.

39. A seal device according to claim 27 wherein said annular inner seal member is a membrane-like element.

40. A seal device according to claim 39 including a spacer element disposed in said membrane-like element, said spacer element having a first spacer element side configured to define a second channel opening facing said central opening, said membrane-like element extending into said second channel opening and co-extensive therewith to form said first channel opening, and a second spacer element side disposed opposite said first spacer element side and adapted to abut said annular outer seal retainer member.

41. A seal device according to claim 40 wherein said membrane envelopes a pair of bellville springs which are in contact at respective outer peripheral edges and operative to bias said membrane coaxially outwardly.

42. A seal device according to claim 27 wherein said annular inner seal member is an elastomer extrusion.

43. A seal device according to claim 42 wherein said elastomer extrusion includes a spring part embedded in said elastomer extrusion.

44. A seal device according to claim 43 wherein said elastomer extrusion has an outer wall and wherein said inner seal retainer portion of said annular outer seal retainer member includes an inner seal retainer wall whereby said outer wall of said elastomer extrusion and said inner seal retainer wall of said annular outer seal retainer member are commonly contoured and abut each other.

45. A seal device according to claim 24 wherein said corrosion-resistant material is selected from a group consisting of: polymers, polyetheretherketone, perfluorelastomers, polytetrafluorethylene, stainless steel alloys and titanium alloys.

* * * * *